PASSIVE RADIO REPEATER TRANSMISSION SYSTEM

Filed Dec. 4, 1961 3 Sheets-Sheet 1

*INVENTOR.*
Leo De Magondeaux

*by* [signature]

ATTORNEY.

PASSIVE RADIO REPEATER TRANSMISSION SYSTEM

Filed Dec. 4, 1961 3 Sheets-Sheet 2

INVENTOR.
Leo De Magondeaux by [signature]

ATTORNEY.

PASSIVE RADIO REPEATER TRANSMISSION SYSTEM

Filed Dec. 4, 1961 3 Sheets-Sheet 3

INVENTOR.
Leo De Magondeaux by [signature]

ATTORNEY.

3,117,277
Patented Jan. 7, 1964

3,117,277

PASSIVE RADIO REPEATER TRANSMISSION SYSTEM

Leo de Magondeaux, 213 Due de Courcelles, Paris, France, assignor of fifty percent to Karl Rath, New York, N.Y.

Filed Dec. 4, 1961, Ser. No. 156,772
Claims priority, application France Sept. 4, 1957
8 Claims. (Cl. 325—6)

The present invention relates to radio transmission systems of the general type described in my U.S. Patent No. 2,812,427, wherein only the receiving end of a radio transmission link is powered, while the transmitting end contains no local power source for its operation. The invention has numerous applications, for instance as a remote control device, as a passive responder or position locator, as an obstacle indicator or collision preventing device, in radiotelemetry and for other uses, where a local power source is undesirable or prohibitive.

In the above patent, there is described a passive radio transmission system, wherein a remote passive responder containing no local power source or active element in the form of vacuum tubes, transistors etc. receives its radio frequency energy from a transmitter-receiver or master station in the form of short wave pulses or energy bursts which, upon reception and, if desirable, after modulation are re-radiated by said responder in the reverse direction or back to said master station in the form of secondary or passive high frequency pulses. In order to separate the primary pulses from the secondary (passive) pulses, the responder includes suitable time delay means, to store and retard the received pulse energy and to re-transmit it to said master station or receiver during the time intervals between said primary pulses. A simple and efficient means and method of effecting the time delay of the passive pulses consists in the use of a piezoelectric crystal tuned to or being resonant to the carrier frequency of the transmitted wave pulses, the time delay being due, for instance, to the production of coupling oscillations by suitably coupling the receiving antenna of the responder with said crystal, as described in greater detail in the above mentioned patent included herewith in the present specification by reference.

While this method of using and separating the primary from the secondary signals, in a manner similar to known pulse amplitude duplex transmission systems, has been found to have numerous applications on account of its great simplicity, especiauly when using a piezoelectric crystal as a resonant and delay device, it is subject to certain practical limitations and shortcomings due mainly to the extended frequency band involved in a pulsed transmission which may cover a range of many megacycles, in such a manner as to cause interference in neighboring radio and television receivers, as well as in commercial radio communication devices. Another disadvantage of a pulsed transmission used with responders of known type is the difficulty to use more than one crystal or equivalent resonant device in order to effect a selective transmission of a plurality of passive signals, for multiple remote control, position indication or communication purposes.

Accordingly, an important object of the present invention is the provision of an improved system for and method of passive radio transmission or remote control by which the above and related difficulties and drawbacks are substantially avoided.

A more specific object of the invention is the provision of a passive responder or radio transmission system, whereby the operating frequency band is reduced considerably or minimized compared with previous passive transmission methods.

Yet another object of the invention is the provision of a system of this type being especially suitable for the simultaneous transmission of a plurality of passive signals, to operate a corresponding number of responders or control devices, such as for multiplex radio telemetry, position location or the like purposes and uses.

The invention, both as to its ancillary objects and novel aspects, will be better understood from the following detailed description, taken in reference to the accompanying drawings forming part of this specification and in which.

Like reference characters denote like parts in the different views of the drawings.

Figure 1:
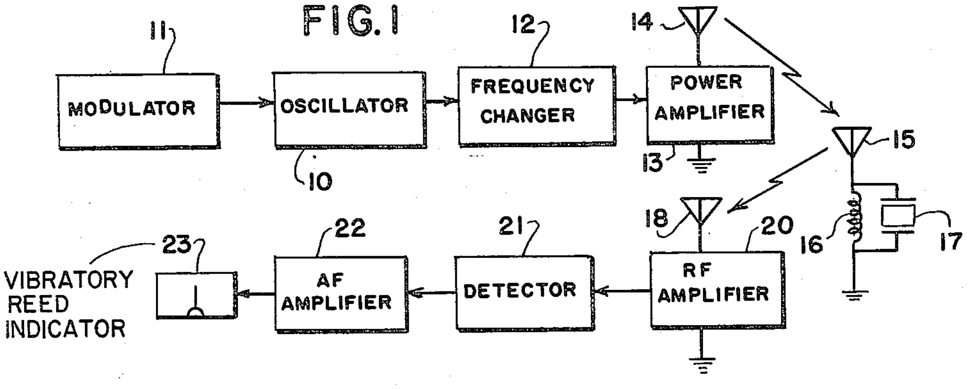
FIG. 1 is a schematic block diagram of a simple passive radio transmission link or responder system embodying the principles of the inventon.

With the foregoing objects in view, the invention involves generally the transmission of a continuous high frequency carrier wave from a transmitter-receiver or master station to one or more passive responders, said carrier wave being frequency modulated at a relatively low rate within a predetermined deviation range according to a periodic function, such as a sinusoidal, triangular or the like function, whereby to involve only a relatively small operating frequency band compared with a pulsed transmission according to the above-mentioned prior patent. As a result, the crystal or the like resonant responder or delay device, being sharply tuned to a definite frequency within the frequency deviation range of said carrier wave, is excited intermittently at the instant of passage or transition of said wave through the crystal frequency, in such a manner as to result in a pulse-like excitation of the crystal at a recurrence or repetition frequency equal or proportional to the modulating frequency of the transmitted carrier wave. The absorbed pulse energies, after adequate time delay, are re-transmitted to the receiver or master station in the form of passive pulses or bursts of high frequency energy. Due to the time delay of the passive pulses, the frequency of the passive pulses differs from the instantaneous transmitting frequency of the primary wave, thus preventing interference between the primary and re-transmitted or secondary (passive) high-frequency signals. The latter, upon reception and detection may serve to operate a suitable control device, such as a vibrating reed resonant to the pulse recurrence frequency or, in turn, to the modulating frequency of the transmitted high-frequency wave. In this form, the invention may be utilized as a simple locating or control device, or responder, to indicate the position of buoys, position markers and all kinds of obstacles (mountain peaks etc.). Instead of operating simply as a responder or locator, the crystal or the like resonant responder may be provided with a suitable modulating device (key, microphone etc.), to transmit signals back to the master station or receiver. In this case, the modulation frequency and, in turn, the passive pulse recurrence frequency should be higher than the highest modulating signal frequency or component, as will be readily understood. As will be further understood, a system of this type is operative and useful for passive signal transmission over distances involving a transit time of the high-frequency waves which is negligible compared with a modulating cycle or pulse recurrence period. Furthermore, instead of continuously varying the transmitted frequency, the same may be varied intermittently or momentarily at the desired time positions within the frequency modulating cycle, as will become further apparent as the following description proceeds.

A method of variation of the latter type lends itself especially to the design of a simple multiplex passive responder or radio transmission system, in that a plurality of sets of consecutive frequency bursts or pulses may be transmitted in mutual interlocking relation and superposed upon the carrier frequency, in the manner of a known pulse multiplex transmission system. Each set of pulses may cooperate with a separate crystal or responder, while the various pulse time channels may be segregated by means of synchronous transmitting and receiving devices, in the manner more clearly shown in the drawings and described in the following.

In place of a piezoelectric crystal, other resonant receiving and delay devices may be employed for the purpose of the invention, such as electric delay lines, echo boxes, etc., being well known to those skilled in the art.

Figure 2A:
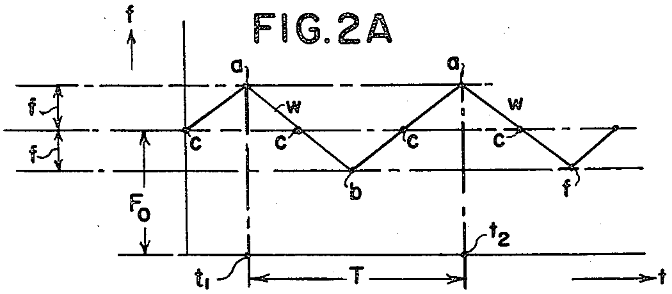
FIGS. 2A, 2B and 2C are graphs explanatory of the function and operation of FIG. 1.

Referring more particularly to FIG. 1 of the drawings, the numeral 10 indicates an oscillator generating a carrier frequency $F_0$, FIG. 2A, which is modulated between upper and lower deviation frequencies $F_0+f$ and $F_0-f$ according to a periodic function having a frequency $1/T$, such as a sinusoidal or symmetrical saw tooth wave $w$, as shown in the drawing. The frequency of the modulated oscillations may be multiplied by means of a suitable frequency changer 12, to produce a desired final operating frequency in the power amplifier 13 feeding a transmitting antenna 14.

Figure 2B:
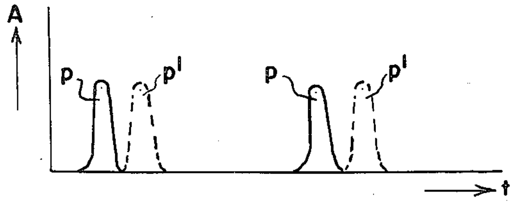

The passive responder, in the exemplication shown, comprises an antenna 15 or the like wave collecting and radiating device, an induction or coupling coil 16 and a piezoelectric crystal 17 connected across or to a portion of said coil in autotransformer fashion. Let it be assumed that the crystal 17, or equivalent sharply tuned or high-Q resonant device, has a resonant frequency, either fundamental or harmonic, equal to the frequency $F+f$ or corresponding to the frequency peaks $a$, FIG. 2A, of the transmitted oscillations. As a consequency, the crystal or the like responder having a resonance characteristic of an effective width being a small fraction of the frequency deviation range of the transmitted oscillation will be intermittently excited upon passage of the incoming frequency through the points $a$ at the instants $t_1$ and $t_2$ being separated by time intervals T determined by the modulating frequency. The RF energy bursts or pulses $p$, FIG. 2B, thus absorbed by the crystal, after proper time delay as a result of the production of coupling oscillations or obtained by any other means, are, in turn, re-transmitted by the antenna 15, to excite the receiving antenna 18 by the delayed (passive) wave pulses $p'$, said antenna forming part of a receiver associated with the transmitting or master station. Due to the time delay of the re-transmitted pulses $p'$, their frequency differs from the instantaneous frequency of the primary or transmitted oscillations, whereby to prevent interference between the primary and secondary (passive) signals. In the drawing, the pulses $p$ and $p'$ represent high frequency oscillation or wave trains with only the envelope of the oscillations being shown for ease of illustration.

The received passive wave pulses, after adequate amplification by means of an RF-amplifier 20 are demodulated in a suitable detector 21, which may be in the form of a crystal diode or the like, to produce D.C. pulses having a recurrence frequency $1/T$ equal to the modulating frequency of the transmitted carrier wave. The detector pulses, after further amplification by means of a low frequency or audio amplifier 22, may serve to operate a frequency indicator 23, such as a vibrating reed being resonant to said modulating frequency, to indicate the presence of the crystal 17, if the device is used as a simple responder, such as a position locator, marker or the like control device.

Instead of using a crystal tuned to the peaks $a$ of the transmitted wave, the crystal may be tuned to the troughs $b$ or to the mid or center points $c$ within the deviation range of the received carrier oscillations. In the latter case, the reed 23 may be tuned to twice the modulating frequency, as will be understood.

Figure 2C:
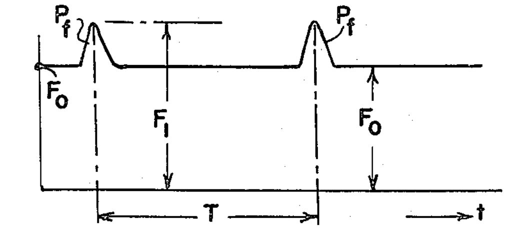

Instead of continuously varying the carrier frequency $F_0$, the latter may be varied intermittently, as shown at $P_f$ in FIG. 2C. This method has the advantage of an increased energy absorption by the crystal, resulting in a greater range of the passive transmission. Furthermore, this method makes it possible to utilize a plurality of frequency modulated pulses or sets of pulses $P_f$ displaced in the manner of a time division pulse multiplex transmission system, to operate a plurality of crystals for effecting different controls over a single passive transmission link.

Figure 3:
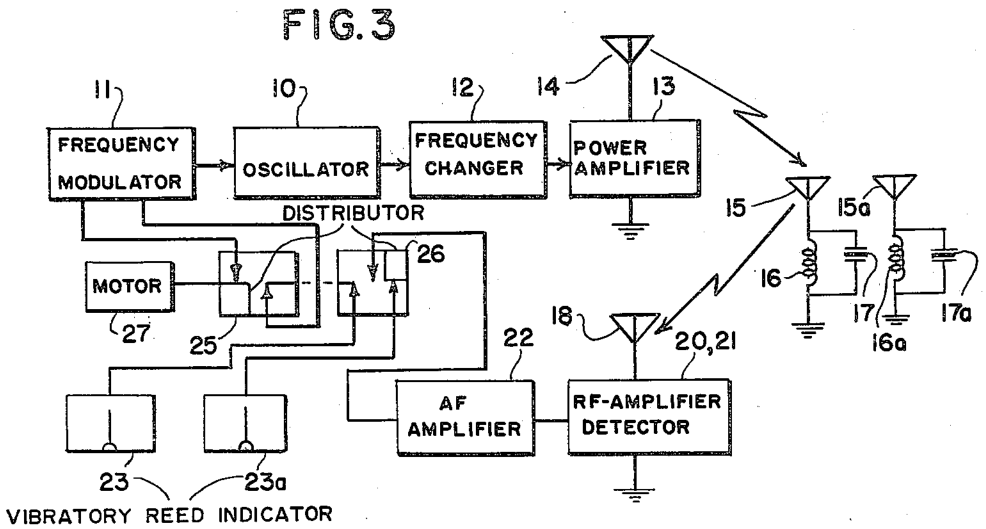
FIG. 3 is a diagram similar to FIG. 1, showing a system for the transmission of more than one passive signal according to the invention.
Figure 4A:
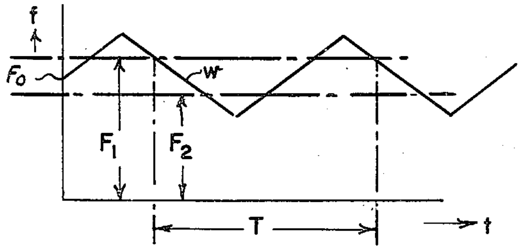
FIGS. 4A and 4B are graphs explanatory of the function and operation of the system shown by FIG. 3.
Figure 4B:
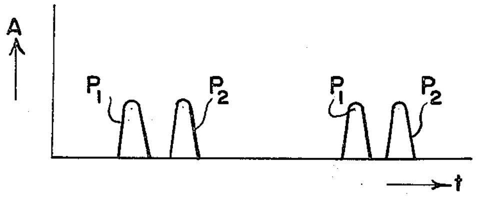

A system of the latter type is shown by way of example, in FIG. 3. The latter differs essentially from FIG. 1 by the provision of a pair of synchronous transmitting and receiving distributors 25 and 26, respectively, driven by a common motor 27. Distributor 25 is connected to the frequency modulator 11 varying the carrier frequency as shown in FIG. 4A, to produce de-tuned or frequency modulated high-frequency pulses $P_1$ and $P_2$ in the output of the oscillator 10, as shown in FIG. 4B. The received and demodulated pulses may be applied by way of the receiving distributor 26 to a pair of tuned reed indicators 23 and 23$a$. In this case, there may be provided two crystals 17 and 17$a$ having antennae 15 and 15$a$ and coupling coils 16 and 16$a$, respectively, being located at different points in space, for passively transmitting different messages or control signals. One of said crystals may be resonant to the frequency $F_1$ and the other crystal may have a fundamental or harmonic frequency being equal to the frequency $F_2$, FIG. 4A. The distributors 25 and 26 being synchronized with the modulating frequency may be of any known type, that is, either mechanical or electronic, as is well known from the art of multiplex signal transmission. In this manner, any desired number of passive signals may be transmitted by a single carrier by a proper design and operation of the transmitting and receiving distributors.

Figure 8:
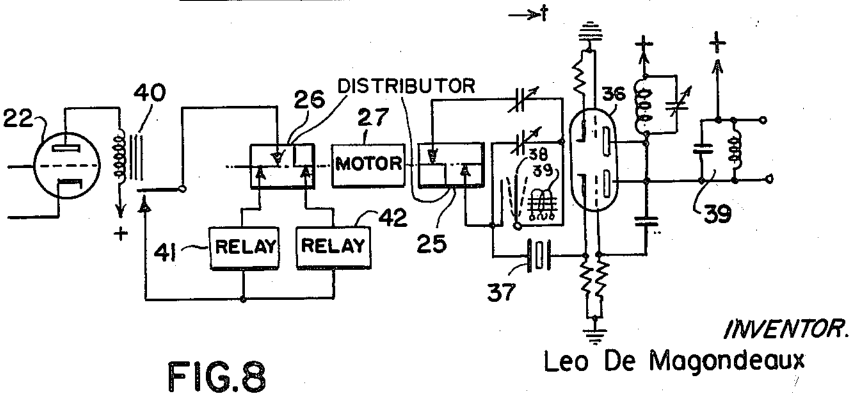
FIG. 8 is a somewhat more detailed schematic diagram showing the synchronous transmitter and receiver portions of a multiplex passive radio transmission or remote control system according to the invention.

According to a simple embodiment of the invention for use as a marker or position locator, the frequency modulator may be a vibrating reed capacitor, as shown in FIG. 8 and described presently, operated at 60 cycles from a power network, in which case the receiving reeds 23 and 23$a$ may also be tuned to a frequency of 60 cycles, while the motor 21 may be a synchronous motor fed from said network. In order to obtain a constant and uniform spacing between the pulses, only the ascending or descending branch of the modulation curve may be used by the proper construction of the distributors, as will be readily understood.

Figure 7:
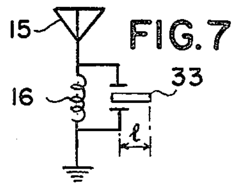
FIG. 6 and 7 show different embodiments of piezoelectric responders suitable for use in carrying into effect the invention.
Figure 6:
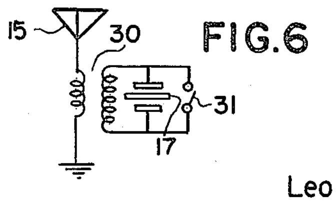

In the case of passive signal transmission, the responder may be provided with a key 31, FIG. 6, shunting the crystal, a microphone or the like signaling device. In the arrangement of FIG. 7, the crystal 33 is excited at one end to act as a supersonic delay line retarding the pulses by an amount depending upon the length $l$ due to reflection from the opposite end of the crystal, in a manner well known to those skilled in the art.

Figure 5A:
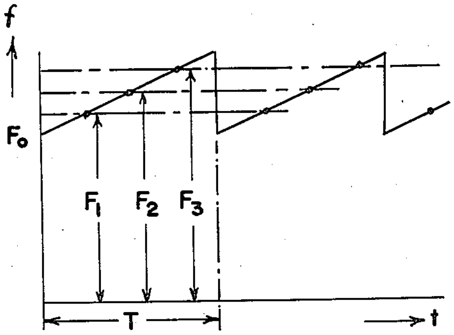
FIGS. 5A, 5B and 5C are further graphs illustrative of an alternative multiplex passive transmission method or system embodying the principles of the invention.
Figure 5B:
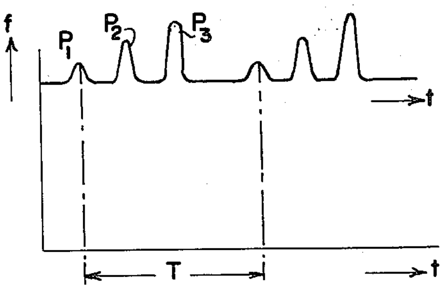
Figure 5C:
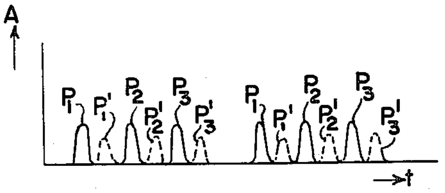

FIGS. 5A, 5B and 5C illustrate another modification utilizing an unsymmetrical saw-tooth wave, FIG. 5A, in place of a symmetrical saw-tooth modulation of the carrier frequency. There are shown by way of example, three frequency modulated transmitting pulses or frequency pulse time channels $P_{f1}$, $P_{f2}$, and $P_{f3}$, FIG. 5B, having instantaneous frequencies $F_1$, $F_2$ and $F_3$ and producing transmitting and receiving pulses $P_1$, $P_2$, $P_3$ and $P_1'$, $P_2'$, $P_3'$, respectively, FIG. 5C, as will be readily understood from the foregoing.

FIG. 8 shows in somewhat greater detail the transmitter modulating and receiver output portions of a multiplex responder system of this type, comprising a crystal-controlled oscillator 36 for stabilizing the center or carrier frequency, said oscillator including, in the example shown, a crystal 37 having it frequency controlled by a vibrating reed capacitor 38 through a magnetic actuating coil 39, to result in a triangular frequency variation, as shown in FIGS. 2A and 4A. As is well known, the frequency of an oscillating crystal can be varied within limits by an auxiliary variable capacitor shunting the inherent capacity between the crystal mounting pates. The distributor 25 serves to periodically interrupt the modulation, to produce a pulse or de-tuned frequency in the output circuit 39 of the transmitter, in the manner shown in FIGS. 2C and 5B. The received and demodulated pulses supplied by the output of the low-frequency amplifier 22 may serve to operate a first tuned relay 40 which in turn controls a pair of output relays 41 and 42 by way of the distributor 26 being synchronously driven with the distributor 25 by the motor 27. The relays 41 and 42 may, in turn, control or operate suitable output or translating devices, such as indicators, recorders, automatic controls, etc.

According to a practical example, using a transmitting frequency in the order of 80 megacycles, obtained for instance from a crystal oscillator in conjunction with a series of frequency doublers or triplers, and using a frequency deviation range of about 100 kilocycles, a number of crystal responders having harmonic resonant frequencies spaced from one another by about 10 kilocycles may be employed in a multiple responder or locating system of the type according to the invention.

As will be understood, where ultra-short or microwaves are used for transmission, the responder or responders may be in the form of high-frequency delay lines, echo boxes or equivalent resonant and delay devices. In this case, the antennae may consist of radiating and receiving horns or directional radiators.

In order to further prevent interference between the transmitter and receiver, either or both of the antennae 14 and 18 may be of the directive type or, if a common transmitting and receiving antenna is used, the receiver may be decoupled from the transmitter by the provision of a known decoupling device, such as a T-R switch well known in radar and the like transmission systems.

The modulation of the carrier frequency may be effected in any other manner and by any known means, either mechanically, as shown in the drawing, or electrically, especially where higher pulse recurrence frequencies are required, as in the case of passive signal transmission. If the frequency is controlled electrically, the desired modulation may be effected by means of a suitably shaped saw-tooth control voltage controlling a reactance tube or equivalent frequency modulating device, as will be readily understood by those skilled in the art.

In the foregoing, the invention has been described with reference to specific illustrative devices. It will be evident, however, that variations and modifications, as well as the substitution of equivalent elements and circuits for those shown herein for illustration, may be made in accordance with the broader scope and spirit of the invention as set forth in the appended claims. The specification and drawings are accordingly to be regarded in an illustrative rather than in a restrictive sense.

This application is a continuation-in-part of my application Serial No. 758,808, filed September 3, 1958, entitled System for and Method of Passive Radio Transmission.

I claim:

1. In a radio transmission system comprising a transmitter adapted to radiate a continuous high frequency carrier wave having a frequency being detuned intermittently and periodically according to different deviation frequencies, groups of intermittent detuning pulses of like frequency deviation being interlocked and following each other periodically, to provide a plurality of frequency modulated pulse time channels in the manner of a time-division pulse multiplex system, a plurality of passive responders remote from said transmitter each having antenna means and resonant receiving and time delay means connected thereto, each said resonant means resonating at a frequency corresponding to a different deviation frequency of said carrier wave, whereby to intermittently absorb wave energy from said carrier wave and to re-radiate time-delay-passive wave pulses by the respective responders, a receiver associated with said transmitter, to receive and detect said passive wave pulses and including a plurality of translating means, and distributing means synchronized with said transmitter and connected between the output of said receiver and said translating means, to energize each translating means by a different passive pulse time channel.

2. In a radio transmission system comprising a transmitter-receiver, said transmitter adapted to produce a continuous high frequency carrier wave, a modulator to periodically vary the frequency of said wave at a predetermined modulating frequency between upper and lower frequency limits, first distributor means operated synchronously with said modulating frequency, to intermittently control said transmitter and to radiate a frequency modulated carrier wave being detuned intermittently and periodically according to different deviation frequencies in the manner of a time-division pulse multiplex system, a plurality of passive responders remote from said transmitter-receiver each having antenna means and resonant receiving and time delay means connected thereto, each said resonant means resonating at a frequency corresponding to one of the deviation frequencies of said carrier wave, to absorb and radiate wave energy in the form of passive wave pulses by the respective responders, said receiver including means to receive and detect said passive wave pulses, a plurality of translating means and further distributor means operated in synchronism with said first distributor means and connected between the output of said receiver and said translating means, to energize each said translating means by a different time channel of the passive wave pulses emanating from said responders.

3. In a radio transmission system as claimed in claim 2, wherein said carrier wave is varied linearly and said responders include piezoelectric crystal resonators resonating at equally spaced frequencies within the range of frequency variation of said carrier wave.

4. In a radio transmission system as claimed in claim 2, wherein said carrier wave is produced by a crystal controlled oscillator and said modulator is comprised of a vibrating reed capacitor to vary the oscillating frequency between upper and lower limits.

5. A wireless transmission system comprising a transmitter producing a continuous high-frequency carrier wave, means to sequentially intermittently vary the frequency of said wave between the carrier frequency and a plurality of different predetermined deviation frequencies, to transmit a frequency-pulsed signal wave by said transmitter, groups of intermittent frequency pulses of said wave of like deviation frequency being interlocked and following each other periodically, to provide a plurality of frequency modulated pulse time channels in the manner of a time-division pulse multiplex transmission system, a plurality of passive responders remote from said transmitter each having wave collecting and translating means, selective time delay means connected to each said last-mentioned means being resonant to a different one of said predetermined frequencies, whereby to re-transmit passive high-frequency pulses by said responders, and receiving means remote from said responders including pulse time channel selecting means, to receive and detect the respective passive wave pulses re-transmitted by said responders.

6. In a transmission system as claimed in claim 5, said receiving means being combined with said transmitter, and a pair of synchronous distributor means controlling said first-mentioned means and said channel selecting means, respectively.

7. A radio transmission system comprising transmitter means to radiate a continuous frequency pulsed carrier wave with groups of intermittent frequency pulses of like deviation frequency being interlocked and following each other periodically in the manner of a time division pulse multiplex system, different pulse groups representing separate time channels and having different deviation frequencies in respect to the carrier frequency, a plurality of passive responders remote from said transmitting means each having wave collecting and time delay means resonant to a different one of said deviation frequencies, to re-radiate time delayed passive wave pulses by said responders, and receiving means remote from said responders including signal channel selecting means, to receive and detect the respective passive wave pulses transmitted by said responders.

8. In a radio transmission system as claimed in claim 7, said receiving means located near said transmitter means and including wave detecting means, and a pair of synchronous time channel selecting devices controlling said transmitter and said signal channel selecting means, respectively.

References Cited in the file of this patent

UNITED STATES PATENTS

| | | |
|---|---|---|
| 2,480,115 | Brown et al. | Aug. 30, 1949 |
| 2,812,427 | Magondeaux | Nov. 5, 1957 |
| 2,818,732 | Bennett | Jan. 7, 1958 |
| 2,927,321 | Harris | Mar. 1, 1960 |